April 25, 1967
R. W. FOSTER-PEGG
3,315,527
MANOMETER APPARATUS
Filed Oct. 22, 1964
2 Sheets-Sheet 1
Fig. 1.
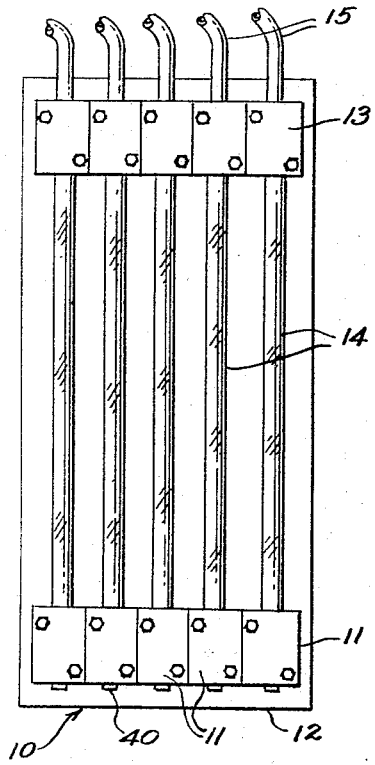
Fig. 3.
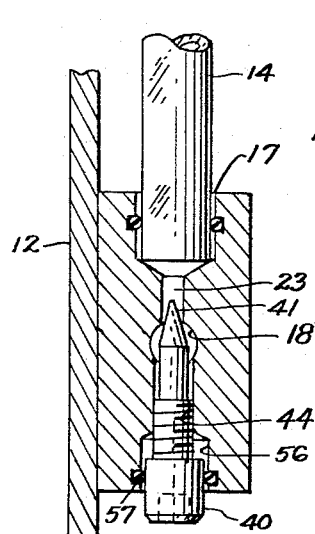
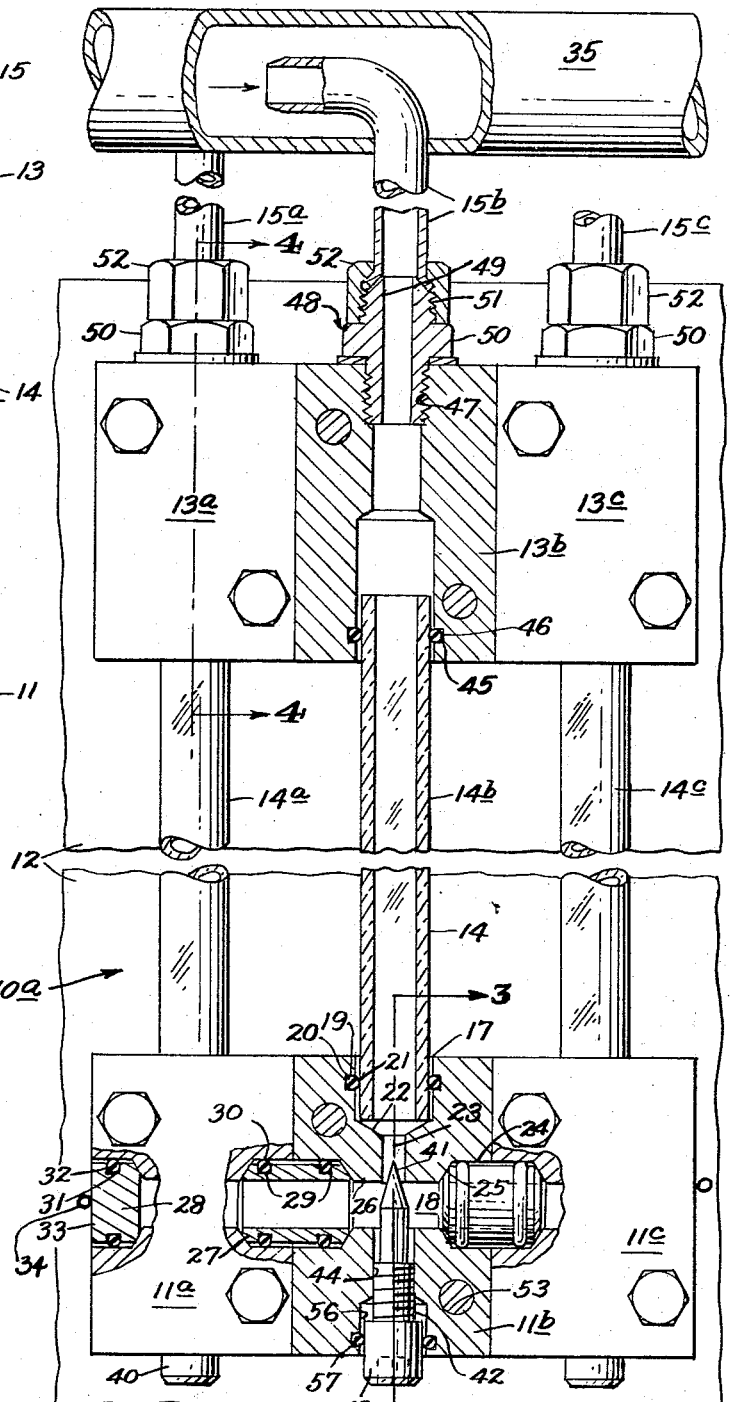
Fig. 2.
INVENTOR
RICHARD W. FOSTER-PEGG
BY
Owen, Wickersham & Erickson
ATTORNEYS April 25, 1967 R. W. FOSTER-PEGG 3,315,527
MANOMETER APPARATUS Filed Oct. 22, 1964 2 Sheets-Sheet 2

INVENTOR.
RICHARD W. FOSTER-PEGG
BY
Owen, Wickersham & Erickson
ATTORNEYS

United States Patent Office 3,315,527
Patented Apr. 25, 1967

3,315,527
MANOMETER APPARATUS
Richard W. Foster-Pegg, San Francisco, Calif.
(402 Liberty St., Warren, Pa. 16365)
Filed Oct. 22, 1964, Ser. No. 405,767
9 Claims. (Cl. 73—401)

This invention relates to manometers adaptable for use in obtaining fluid pressure measurements during laboratory testing operations and the like.

Manometers, which may be described generally as devices for measuring differences in pressure by means of liquid columns, are used extensively in experimental test work. Often more than one manometer is required on a single test. In fact, it is quite common for readings to be obtained from a large number of pressure taps, and this requires a large array of manometers. Heretofore, it was necessary to provide a fixed manometer apparatus for each test setup with the appropriate number of tubes. On a subsequent test, the same manometer apparatus would either have an inadequate number of tubes or too many, and either a new apparatus would be required or the existing equipment would be use inconveniently.

A major object of the present invention is to provide a manometer apparatus composed of a unique combination of components which can be connected together and combined with any number of additional like components to form a manometer apparatus having the desired number of tubes for servicing the various pressure taps of a particular test setup.

Another object of my invention is to provide a plurality of modular components that can be quickly assembled without special tools to form a manometer apparatus having the necessary number of pressure measuring tubes in the most efficient and convenient arrangement.

Still another object of the present invention is to provide a multiple tube manometer assembly comprised of components that are simple and readily adaptable for ease and economy of manufacture.

Some important advantages of my manometer apparatus are : (1) its components can be quickly assembled to provide the most appropriate testing apparatus having the exact number and arrangement of manometer tubes needed for a particular test; (2) the entire apparatus is compact and thus requires a minimum of space; (3) it is rugged and durable; (4) it is easily disassembled for storage; (5) it is less prone to leakages and other troubles; and (6) serious damage can be avoided easily by cutting off the flow to any portion of the apparatus that develops a malfunction.

Other objects, advantages and features of the invention will become apparent from the following detailed description taken with the accompanying drawings, in which:

FIG. 1 is a view in elevation showing a manometer apparatus embodying the principles of the invention;

FIG. 2 is an enlarged view and partially in section of the manometer system of FIG. 1;

FIG. 3 is a view in section taken along the line 3—3 of FIG. 2;

Figure 5:
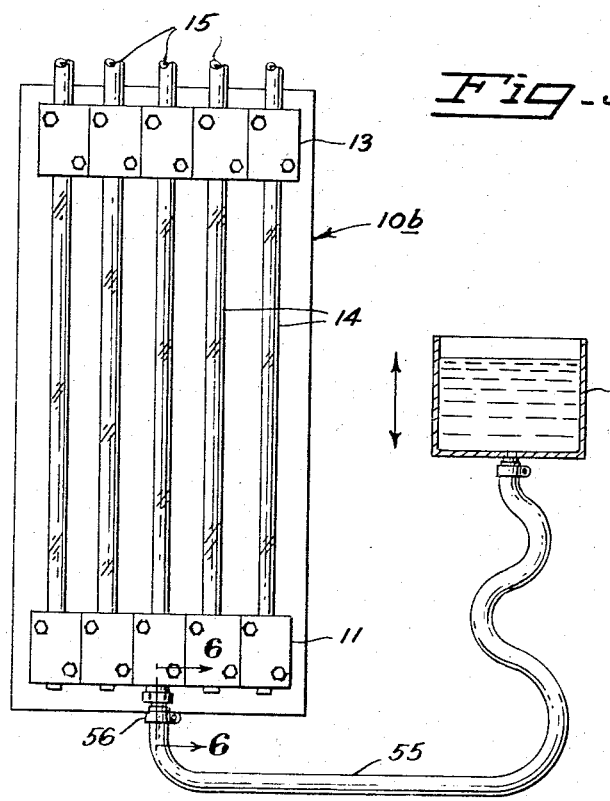
FIG. 5 is a view in elevation showing another manometer apparatus embodying the principles of the present invention.

In broad terms, the concept of my invention is that of a manometer apparatus comprised of a plurality of unique modular components that are interconnected, but easily separable, and to which additional like components can be easily added, or from which such components can be subtracted to provide the exact apparatus necessary to handle a given pressure measuring problem.

With reference to the drawings, FIG. 1 shows a typical multiple tube manometer apparatus 10 comprised of modular elements embodying the principles of the invention. For purposes of illustration, the apparatus 10 is shown having five manometer tubes and is, therefore, capable of providing five pressure readings simultaneously. However, as will become apparent from the following detailed description, the modular components according to my invention are readily adaptable to be interconnected in a wide range of configurations wherein any desired number of pressure readings can be made simultaneously by the use of additional modular elements. As shown in FIG. 1, the apparatus 10 is comprised of a series of rectangular shaped interconnecting blocks 11 which are arranged in a row closely adjacent each other and connected to a planar mounting board 12 near its bottom. An equal number of similar shaped top blocks 13 are spaced directly above the bottom interconnecting blocks 11 and are also attached to the mounting board 12. Each of these latter top blocks 13 is positioned directly above a bottom block 11 and serves to support and position vertically a transparent manometer tube 14 extending between a pair of top and bottom blocks. To the top of each top block is connected a pressure tap lead tube or hose member 15 which extends to the point on the test apparatus where pressure is to be measured.

Turning to FIG. 2, each top block 13, as shown, has a passage extending completely through it from its upper to its lower end which interconnects the manometer tube 14 with the pressure tap lead tube 15. Each of the bottom blocks 11 has a vertical or longitudinal passage 17 extending downwardly from its upper end in which a manometer tube 14 is supported, and connected therewith is an intersecting transverse passage 18 that extends completely through the bottom block from side to side. In accordance with the principles of the invention, means are provided in combination with the transverse passage 18 either to plug it and prevent the flow of fluid, or to convey fluid pressure to the next adjacent block and thus to its manometer. This fundamental flexibility enables almost any multiple tube manometer arrangement to be easily set up when necessary to fulfill the requirements of various laboratory testing problems.

The vertical passage 17 in each bottom block 11 has a relatively smooth bore portion 19 of uniform diameter which extends downward from its opening into the block. Spaced inwardly from the opening of the bore 19 at the upper end of the block is an annular groove 20 in which is seated a standard elastomeric O-ring 21. The O-ring 21 has an inner diameter which is less than that of the bore 19, and thereby forms an interference fit with the manometer tube 14 whose diameter is slightly larger. The latter is thereby held tightly and is sealed by the O-ring 21 when forced into the opening 19. Within each block 11 the passage 17 tapers at an internal shoulder 22 to a smaller diameter passage 23 which is intersected by the transverse passage 18.

The transverse passage 18 through each block 11 has outer bore portions 24 with a constant diameter that extend inwardly from opposite sides of the block. These outer bore portions 24 have a length which is less than one half the width of the block. Within each block, the outer bore portions 24 each taper down at an internal shoulder 25 and are interconnected by a central portion 26 of the passage 18 that has a smaller constant diameter. It is this central portion 26 of the transverse passage 18 that is intersected by the smaller diameter portion 23 of the longitudinal passageway 17.

The outer bore portions of the transverse passage 18 in each bottom block 11 are adapted to receive either a tubular grommet member 27 or a cylindrical plug member 28, depending on the particular manometer arrangement desired. Each grommet 27 is cylindrical in shape and has an outer diameter that provides a loose fit with the outer bore portions 24 of the bottom blocks 11. The ends of each grommet are chamfered and its overall length is less than twice the length of an outer bore portion 24. A grommet 27 can thus fit within the outer bores 24 of adjacent bottom blocks 11 so that the flat sides of adjoining blocks can lie flat against each other. Near each of its ends each grommet 27 has an annular groove 29 in which are seated standard O-rings 30. When in place, the O-rings 30 have an outer diameter that is greater than the outer diameter of the grommet 27 and also greater than the diameter of the outer bore portions 24 in the block. Thus, when the grommet is in place interconnecting two adjacent bottom blocks, such as the blocks 11a, 11b and 11c, as shown in FIG. 2, the O-rings 30 are compressed and a fluid tight passage is provided between the blocks. In the outer bore portions of the blocks 11a and 11c, which do not connect with adjacent blocks, a plug member 28 is utilized to prevent any flow or loss of pressure therethrough. Each plug 28 has the same outer diameter as a tubular grommet member 27 and is provided with a groove 31 near one end in which is seated an O-ring 32. The length of the plug member 28 is preferably somewhat less than that of an outer bore portion 24 so that the plug can be fully inserted therein with its end face 33 flush with the side surface of the block 11. When the bottom blocks 11 are secured to the board 12, the plug members 28 on the end blocks can be easily retained in place by any suitable means such as a nail or screw 34 driven into the board adjacent to the plugs.

The manometer apparatus 10a, shown in FIG. 2, illustrates how the elements embodying the principles of my invention cooperate when assembled. This particular manometer arrangement is one that would be used for determining the rate of flow in a gaseous fluid conduit. A first pressure tap 15b extends within a conduit 35 carrying a flow of liquid to measure the dynamic pressure therein. A second pressure tap 15a provides a reading for the static pressure within the conduit 35 at its inner surface, and a third pressure tap 15c is open and, therefore, provides atmospheric pressure through the tube 14c with atmospheric pressure a known quantity, the dynamic and static pressures can be obtained by observing the level differences of a fluid in the tubes 14a and 14b as compared with that in tube 14c. Using well known fluid dynamics formulae, the two pressures thus provided are sufficient to calculate the fluid flow rate in the pipe.

In one or more of the bottom blocks 11 I may provide a shutoff or damping valve 40. This valve comprises a screw type member having a conical end portion 41, a series of threads 42 in the central portion and a cylindrical head portion 43 that may be provided with a slot or a hexagonal recess so that it can be turned by the appropriate tool. The valve member 40 is adapted to be screwed into a threaded opening 44 at the bottom of the block. When inserted fully, its conical end portion 41 will seat with and completely close the orifice or passage 23 that normally connects the transverse passage 18 with the vertical passage 17 in any block 11. The lower end of the passage 16 below the threads 42 has a smooth bore 56 with a diameter slightly larger than the screw head 43 and seated within the bore 56 at a small distance from its opening is an O-ring 57. Thus, when the valve 40 is in either the open or closed position, its head 43 is at least partially within the bore 56 and sealed by the O-ring 57. When adjusted to a partially closed position, the valve member 40 may be particularly useful for damping any pressure oscillations in any of the manometer tubes 14 that may be caused by pressure variations at the pressure pickup. Another important feature of the valve 40 is that it can completely shut off the fluid to a manometer tube by closing the passage 23, thereby isolating it from the rest of the system, and preventing the loss of all the fluid if a leak should develop in the system during testing.

Figure 4:
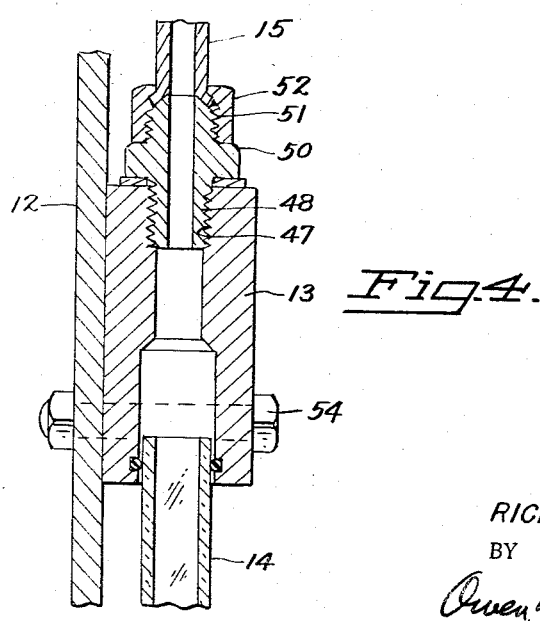
FIG. 4 is a view in section taken along the line 4—4 of FIG. 2.

The top mounting blocks 13 in all manometer systems which may be devised according to the invention are substantially identical with each other and have the same shape as the bottom blocks 11. As stated previously, each block 13 has a vertical passageway 16 in the bottom of which a manometer tube 14 is secured. Spaced inwardly from the bottom end of the passageway 16 is an annular groove 45 adapted to retain an O-ring 46 that provides an interference fit with the manometer tube 14, thus sealing around the tube when it is in place. The upper end of the passage 16 in each top block 13 is provided with a series of threads 47 and is therefore adapted to receive a standard pipe fitting 48 having a central bore 49 (see FIG. 4). The latter has a central hex nut portion 50 and a threaded portion 51 extending above the top block when connected thereto. A threaded coupling nut 52 provided at the end of each pressure tap tube 15 thereby makes the latter readily attachable to the threaded portion 51 of the fitting 48.

The bottom and top blocks 11 and 13, respectively, can all be made of any suitable material such as metal or plastic. Each may be provided with a pair of holes 53 to facilitate their attachment to the mounting board by a suitable fastener such as a machine screw 54. The mounting board may be provided with graduated indicia on its surface in back of the tubes 14 or such indicia can be applied directly to the manometer tubes which are made of some suitable transparent material such as glass or plastic.

To set up a multi-tube manometer installation, such as the apparatus 10a shown in FIG. 2, the bottom block 11a provided with a side plug 28 is first attached to the mounting board 12 near its lower edge. A grommet 27 is then inserted in the opposite side bore of the block 11a and also into the second block 11b which is pressed closely adjacent to the first block and also attached to the board. The third block 11c and a connecting grommet are connected together in a like manner. The top blocks 13a, 13b and 13c are then attached to the mounting board at a predetermined distance directly above the bottom blocks 11a, 11b and 11c, respectively. Manometer tubes 14 are now installed, the blocks having been attached at a predetermined distance apart so that each tube is first inserted into the bottom bore of the top block until it can be backed downward into the top bore of the vertically aligned bottom block. When the lower end of the tube is seated against the shoulder 22 its upper end still extends above the O-ring 46 and is thus well sealed at both ends. The other tubes are similarly connected to the blocks. Thus, when necessary, a broken, dirty or otherwise defective tube 14 can be replaced in the apparatus without dismantling any other part of the system. When the fittings are attached to the top blocks and the appropriate pressure tap tubes 15 are connected thereto, the apparatus is ready to function and further procedure as to its operation follows that for any standard manometer system.

Figure 6:
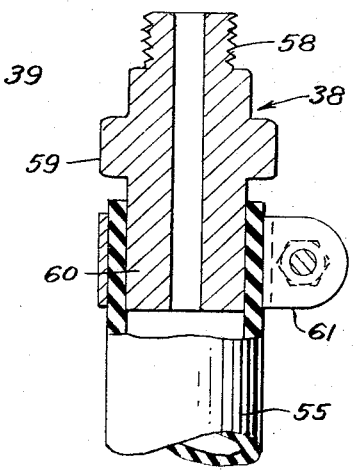
FIG. 6 is an enlarged view in section taken along the line 6—6 of FIG. 5.

From the foregoing description of the principal elements of my invention, namely, the bottom blocks 11, the top blocks 13 and the interconnecting manometer tubes 14, the extreme versatility of my invention can be appreciated by those skilled in the art. In FIGS. 5 and 6, an apparatus 10b embodying yet another arrangement is shown wherein my manometer invention is adaptable for use with a movable common reservoir system. A datum pressure of the reservoir may be applied to all of a series of interconnected bottom block members 11 through a conduit line 55 that is connected to a fitting 38 which may be attached to one of the bottom block members at the same threaded opening as a valve member 40. In such a system a common well or reservoir 39 is supplied which can be raised or lowered with respect to the manometer tubes so that a datum pressure is provided to each of the bottom blocks and a level can then be established in the tubes which will enable both plus or minus pressures on the tubes to remain within the range of the tube length either above or below the datum level. While this system is not in itself novel, it is described and illustrated here to demonstrate the versatility of my invention. The fitting 38, as shown in FIG. 6, comprises a tubular member having a threaded end portion 58 and a flat sided central portion 59 which allows it to be gripped by a wrench and threaded into the threads 44 of a bottom block 11. At the bottom end 60 of the fitting, a clamp 61 is provided to attach the hose or tube 55 that extends to the common well or reservoir 39. In this arrangement, each of the bottom blocks would be interconnected by grommets 27 of the type previously described. The common well pressure supplied to each tube 14 would be offset by the pressure supplied from its own pressure tap and the differential pressure would be indicated by the liquid level in each tube.

The foregoing illustrates how the present invention can be applied to form any manometer arrangement needed. Moreover, it is as equally useful for use with liquids to measure gas pressure as it is with gas or air to measure liquid pressure in a test setup. In this event, two more of the top and bottom blocks can be interchanged without destroying the harmony of the assembly.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A manometer apparatus for simultaneously measuring pressure at a plurality of locations comprising:
   a mounting board having a substantially plane surface;
   a plurality of lower block members fixed to said board, each having the same external shape with flat side faces that are parallel with each other, a vertical passage extending downwardly from its top end and a horizontal transverse passage extending between opposite side faces and intersecting said vertical passage, said block members being arranged adjacent each other on said board with their side faces engaged;
   a tubular grommet means retained in and adapted to interconnect the transverse passages of adjacent block members;
   removable plug means for closing the transverse passage opening on the one side of each lower end block member that is not adjacent another said block member without blocking the communication of the vertical and horizontal passages within the block member;
   a transparent tube retained in the upper end of said vertical passage in each said block;
   indicator fluid in said transparent tube; graduated indicia associated with said tube;
   and a plurality of upper block members for retaining said transparent tubes in a fixed vertically oriented position on said board, each upper block member having a vertical passage including a smooth bore portion at its lower end for supporting a said transparent tube and means at its upper end for coupling said upper block to a pressure tap line and a pressure tap line coupled to said each upper block member;
   and means in said upper and lower block members providing a fluid tight seal around said tubes.

2. The apparatus as described in claim 1 wherein said upper block members have the same external shape as said lower block members and are fixed to said mounting board adjacent each other, thereby maintaining the vertical alignment of all of the transparent tubes.

3. The apparatus as described in claim 1 wherein at least one of said bottom block members has a valve member threadedly engaged within the vertical passage thereof at its lower end, said valve member having an end portion for reducing the flow through or completely closing the vertical passage and thereby preventing flow to the transverse passage.

4. The apparatus as described in claim 1 wherein said valve member has a cylindrical head slightly smaller in diameter than the diameter of the lower end of said vertical passage, and means for providing a fluid tight seal around said cylindrical valve head.

5. A modular coupling device for supporting an array of transparent tubes containing indicator fluid coupled to a pressure tap line, a manometer apparatus comprising:
   a rectangular shaped block having flat opposite side faces and opposite end faces;
   a vertical passage extending downwardly from the upper end face for receiving one end of a rigid transparent tube associated with graduated indicia, and an O-ring seated within said vertical passage having an inside diameter slightly less than the outer diameter of the tube;
   a transverse passage extending inwardly from said opposite side faces and intersecting said vertical passage within the block;
   a removable tubular grommet member retained in said transverse passage, said grommet extending beyond the side face of said block for about one half of its length when fully lodged therein;
   and O-ring means for providing a fluid tight seal around said grommet member.

6. The coupling device as described in claim 5 including a valve member threadedly engaged with said block at its lower end and axially aligned with said vertical passage, said valve member having an end portion for reducing the size of or closing the vertical passage and thereby preventing flow to the transverse passage.

7. The coupling device as described in claim 5 including a threaded fitting secured in its lower end and connected by a passage to said transverse passage, said fitting being thereby adapted to be connected to a reservoir serving a plurality of interconnected coupling devices.

8. A modular coupling device for supporting an array of transparent tubes containing indicator fluid coupled to a pressure tap, a manometer apparatus comprising:
   a rectangular shaped block having flat opposite side faces and flat opposite end faces;
   a vertical passage extending downwardly from the upper end face having a relatively large smooth bore portion for receiving one end of a rigid transparent tube associated with graduated indicia, an O-ring seated within said large bore portion, and an internal shoulder forming a smaller bore portion connected with said large bore portion;
   a transverse passage extending between said opposite side faces including relatively large smooth bore portions extending inwardly from side openings a predetermined distance and terminating at internal shoulders forming a connecting central passage of a smaller diameter intersecting said vertical passage;
   a removable tubular grommet member having O-rings seated near its ends and retained in one smooth bore portion of said transverse passage, said grommet extending beyond the side face of said block for no more than one half of its length when seated at one end on an internal shoulder within said transverse passage;
   and adjustable valve means for closing said vertical passage and preventing flow into said transverse passage.

9. A manometer apparatus for simultaneously measuring pressure at a plurality of locations comprising:
a mounting means having a substantially plane surface;
a plurality of block members fixed to said plane surface, each having the same external shape with flat, parallel side faces, a vertical passage extending downwardly from its top end and a horizontal transverse passage extending between at least one opposite side face and intersecting said vertical passage, said block members being arranged adjacent each other on said mounting means with their side faces engaged;
an O-ring seated within a groove located near the upper end of said vertical passage and a similar O-ring seated within a similar groove at the lower end of said vertical passage of each said block member;
a tubular means retained in and adapted to interconnect the transverse passages of adjacent block members;
an O-ring located near each end of said tubular means for sealing it within aligned transverse passages of adjacent block members;
removable plug means for closing the transverse passage opening on the one side of each end block member that is not adjacent another said block member without blocking the communication of the vertical and horizontal passages within the block member and means for sealing said plug means;
a transparent tube associated with graduated indicia and containing indicator fluid coupled to a pressure tap retained in the upper end of said vertical passage in each said block;
and means for retaining said transparent tubes in a fixed vertically oriented position on said board.

References Cited by the Examiner

UNITED STATES PATENTS

| | | | |
|---|---|---|---|
| 375,054 | 12/1887 | Dudley | 73—401 |
| 1,812,152 | 6/1931 | Jensen | 73—401 |

LOUIS R. PRINCE, *Primary Examiner.*

D. WOODIEL, *Assistant Examiner.*